United States Patent
Lettström et al.

(10) Patent No.: US 9,211,837 B2
(45) Date of Patent: Dec. 15, 2015

(54) PEDESTRIAN WARNING DEVICE FOR A VEHICLE

(75) Inventors: Richard Lettström, Djursholm (SE); Peter Kylin, Karlstad (SE); Bo Svensson, Djursholm (SE)

(73) Assignee: CONCORDE INVEST AB, Djursholm (SE)

( * ) Notice: Subject to any disclaimer, the term of this patent is extended or adjusted under 35 U.S.C. 154(b) by 522 days.

(21) Appl. No.: 14/002,445

(22) PCT Filed: Mar. 1, 2011

(86) PCT No.: PCT/SE2011/050227
§ 371 (c)(1),
(2), (4) Date: Oct. 11, 2013

(87) PCT Pub. No.: WO2011/108979
PCT Pub. Date: Sep. 9, 2011

(65) Prior Publication Data
US 2014/0035740 A1   Feb. 6, 2014

(30) Foreign Application Priority Data

Mar. 1, 2010   (SE) .................................. 1000190
Mar. 5, 2010   (SE) .................................. 1000206

(51) Int. Cl.
*B60Q 1/44*   (2006.01)
*B60Q 1/00*   (2006.01)

(52) U.S. Cl.
CPC .............. *B60Q 1/442* (2013.01); *B60Q 1/0035* (2013.01); *B60Q 1/0052* (2013.01)

(58) Field of Classification Search
CPC ................. B60Q 1/442; G08B 1/005
USPC ......... 340/479, 471, 472, 474, 468, 463, 464, 340/467
See application file for complete search history.

(56) References Cited

U.S. PATENT DOCUMENTS

| | | | | |
|---|---|---|---|---|
| 3,908,144 | A | * 9/1975 | Rudd | 313/114 |
| 5,025,245 | A | 6/1991 | Barke | |
| 5,373,426 | A | * 12/1994 | O'Sullivan | 362/496 |
| 5,798,691 | A | * 8/1998 | Tim Kao | 340/479 |
| 6,690,272 | B2 | * 2/2004 | Hall | 340/479 |
| 6,864,787 | B1 | * 3/2005 | Veach | 340/479 |
| 8,537,030 | B2 | * 9/2013 | Perkins | 340/904 |
| 2008/0094254 | A1 | 4/2008 | Hill | |

FOREIGN PATENT DOCUMENTS

| | | |
|---|---|---|
| DE | 3408270 | 9/1985 |
| WO | 0213162 | 2/2002 |
| WO | 2008156378 | 12/2008 |

OTHER PUBLICATIONS

International Search Report dated May 24, 2011, corresponding to PCT/SE2011/050227.

* cited by examiner

*Primary Examiner* — Toan N Pham
(74) *Attorney, Agent, or Firm* — Young & Thompson

(57) ABSTRACT

A pedestrian warning device for a vehicle (1), especially a vehicle which is intended to be driven on public roads, includes a programmable unit, such as a CPU (3), and a brake pedal (5). The device includes further at least one front brake lamp (2, 13, 15) mounted at the front portion of the vehicle (1). The front brake lamp can be lightened up by the programmable unit (3) when certain predetermined conditions are met. Moreover, the device includes an awareness signal apparatus (10) provided with at least one awareness lamp (12).

16 Claims, 1 Drawing Sheet

US 9,211,837 B2

PEDESTRIAN WARNING DEVICE FOR A VEHICLE

TECHNICAL FIELD

The present invention is related to a pedestrian warning device, and of the kind which is defined in the pre-characterising portion of claim 1.

BACKGROUND OF THE INVENTION

Such a pedestrian warning device is disclosed in the German patent specification, DE 3408270 which discloses a system wherein a brake signal lamp at the front of the vehicle is lightened up when the rear brake lamp is illuminated. One drawback of the pedestrian warning device according to DE 3408270 is that the lamp will be illuminated as soon as the brake pedal is pressed down. So, if the driver just leans the foot on the brake pedal the lamp could be illuminated.

U.S. 2008094254, WO0213162 and WO 2008156378 and normally detects that a pedestrian is intended to cross the road or detects that the road signal is going to be red thereby warning the driver before a cross road point. These devices also warn the pedestrian and emit an acoustic signal when the pedestrian is in front of the vehicle. A drawback with such a device is that the device will emit an acoustic signal every time the vehicle approaches another vehicle in a traffic jam.

In U.S. Pat. No. 5,025,245 a pedestrian signal system for automobiles is disclosed. This system functions in such a way that the driver can push a button to actuate the system and by thereafter pressing the brake pedal flashing means actuate the turn lights of the pedestrian signal system. The system is actuated by the driver by pushing a button which is an unreliable way of operation.

OBJECTS OF THE INVENTION

The object of the present invention is to provide a pedestrian warning device for a vehicle which will reduce the risk of a collision between a vehicle and a pedestrian.

Another object is to provide a pedestrian warning device for a vehicle wherein the pedestrian is able to acknowledge that a vehicle is provided with a pedestrian warning device for a vehicle according to the invention.

BRIEF SUMMARY OF THE INVENTION

These objects are achieved by means of a pedestrian warning device for a vehicle having the characteristics defined in claim 1.

Preferred embodiments of the invention have been given the characteristics which are apparent in the sub claims.

By means of the pedestrian warning device according to the invention a pedestrian will acknowledge that a vehicle driver is actuating the brake of the vehicle and can therefore safely cross the road. The warning device will not be actuated when the brake pedal is only touched. So, if the driver just leans the foot on the brake pedal the lamp will not be illuminated. It will be illuminated when the brake pedal has been pressed down a predetermined distance and further or by a predetermined pressure and more. The pedestrian must also be aware of that the pedestrian warning device according to the invention is installed in the vehicle in question. This can be achieved by an awareness signal apparatus comprising at least one awareness lamp with a special appearance, such as providing the brake lamp with a surrounding light frame with LED-lamps or by providing the awareness lamp with a special coloured light or with a special geometric form.

The pedestrian warning device is especially favourable at a pedestrian crossing without a semaphore, but can also be advantageous at crossings with semaphores. When a pedestrian is intended to cross the road the pedestrian warning device according to the invention will show that the vehicle driver has pressed down the brake pedal and thereby has acknowledged that the pedestrian is going to cross the road or, when the crossing has a semaphore, that the driver has acknowledged that the semaphore has turned to red. Thereby, the pedestrian is informed that the road can be safely crossed.

The pedestrian warning device according to the invention will reduce injuries due to collisions between pedestrians and automobiles.

BRIEF DESCRIPTION OF THE DRAWINGS

The invention is described in the following with reference to the appended drawing showing a preferred embodiment.

DESCRIPTION OF A PREFERRED EMBODIMENT OF THE INVENTION

Figure 1:
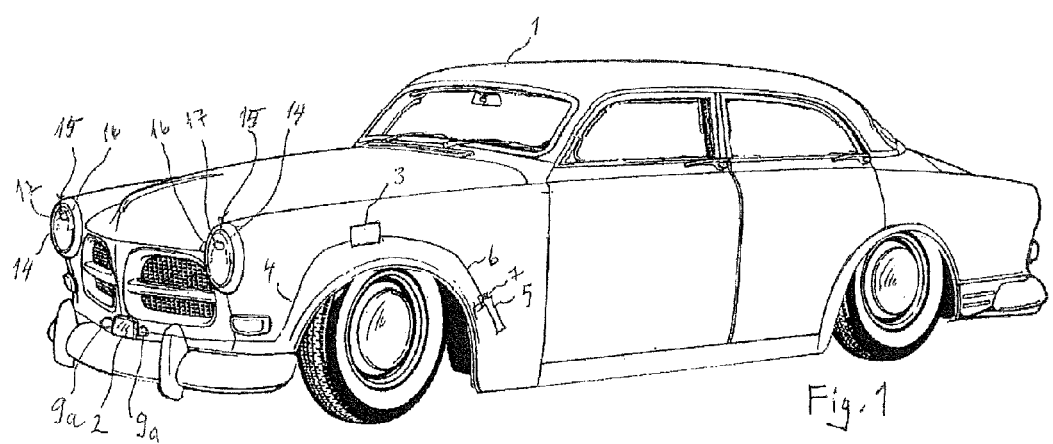
FIG. 1 shows a perspective view of a vehicle, such as an automobile, including a first embodiment of a pedestrian warning device according to the invention which can be mounted on a vehicle front.

FIG. 1 shows a vehicle, such as an automobile 1, having a first embodiment of a pedestrian warning device according to the invention comprising a front brake lamp 2 mounted at the front thereof at a position where it can be easily observed by a pedestrian which intends to cross the road in front of the automobile 1. The front brake lamp 2 is connected by cables 4 to a schematically illustrated CPU (Central Processing Unit) 3 of the automobile 1. The CPU 3 is further connected to a schematically illustrated brake pedal 5 by means of a cable 6. When the driver presses the brake pedal 5 the CPU 3 is activated to lighten up the front brake lamp 2 under certain predetermined conditions which will be described in greater detail below so that a pedestrian can be informed that the driver of the automobile 1 has perceived that the automobile has to be stopped. Such a condition could be that the driver has started to press the brake pedal 5 a predetermined distance and further or by a predetermined pressure and more.

The brake pedal 5 is equipped with a micro switch 7 which preferably is installed in such a way that it gives a signal to the CPU only when the brake pedal 5 is pressed down a predetermined distance and further or by a predetermined pressure and more. The micro switch can also be of the kind that gives the CPU 3 a signal to which amount the brake pedal 5 is pressed down. Thereby, the CPU can be programmed in such a way that the front brake lamp 2 is not lightened up when the foot of the driver just rests on the pedal 5. The driver must activate the front brake lamp 2 under certain predetermined conditions, such as pressing the brake pedal 5 with a certain predetermined force which only is performed if the driver really intends to brake the vehicle. This force could correspond to a predetermined distance that the brake pedal 5 is pressed down. An awareness signal apparatus 9 of the pedestrian warning device according to the invention comprises two lamps 9a, such as each having a number of LED-lamps, situated at each side of the lamp 2 opposite each other. The central brake lamp 2 is mounted between the awareness signal lamps 9a.

Figure 2:
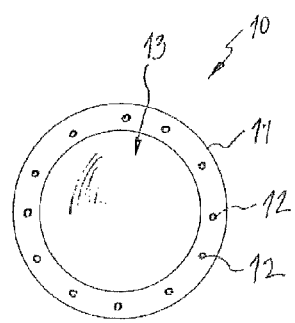
FIG. 2 shows a front view of a second embodiment of a pedestrian warning device according to the invention which can be mounted on a vehicle front.

FIG. 2 shows a second embodiment of a pedestrian warning device according to the invention comprising an awareness signal apparatus 10 which includes a circular light frame 11 with awareness lamps 12, such as twelve LED-lamps 12, equally spread along the circumstance of the frame. The pedestrian warning device according to the invention further comprises a central brake lamp 13 which is mounted within the frame and which can be of the type of brake lamp 2 described above with reference to FIG. 1.

When the vehicle is driven below a predetermined speed level, e.g., in the range of 20 to 35 km/h, preferably about 30 km/h, the awarness signal device is activated and the awareness lamps 9a, 12 are illuminated so that the pedestrian can notice that the vehicle is provided with a pedestrian warning device according to the invention. When the driver actuates pedestrian warning device to meet certain predetermined conditions, as the driver presses the brake pedal of the vehicle a predetermined distance and further or by a predetermined pressure and more, the central brake lamp 13 is lightened up, the pedestrian can detect that the vehicle is being braked by the driver of the vehicle. In FIG. 2 twelve awareness LED-lamps are shown which is only by way of example. The number of awareness LED-lamps can be varied within the scope of the claims. The interspaces between each lamp are preferably the same but can also be varied for the purpose of recognition that a vehicle is provided with a pedestrian warning device according to the invention. Since at the beginning of the use of the pedestrian warning device according to the invention only a few vehicles on public roads are possibly provided therewith, it is most important that the pedestrian is aware of and recognises the pedestrian warning device without doubt. This is achieved with the special awareness signal apparatus 10 with the awareness lamp or lamps 12 and the light frame 11 surrounding the front brake lamp 13. The awareness lamp or lamps 12 can of course be illuminated in any other known way, e.g. the light frame 11 can consist of or comprise only one annular lamp. Instead of the light frame 11 one or more awareness lamps 12 near the brake lamp 2 or 13 could be provided, whereby the awareness lamp or lamps 12 could have a special colour or/and a special geometric form. Also the form of the awareness lamp or lamps 12 and/or the brake lamps 2 or 13 can be varied, i.e., the form of the lamps does not have to be circular. The light frame 11 could e.g. extend over only a part of the central brake lamp 13. The lamps 2, 11 and/or 13 could be modified to a rectangular or any other geometric form. However, the circular form is most convenient as it is cheaper to manufacture and also more easy to make water resistant.

The CPU 3 is programmed in such a way that the pedestrian warning device according to the invention only can be actuated when certain conditions are met, e.g. when the vehicle 1 is driven below a predetermined speed level, e.g., in the range of 20 to 35 km/h, preferably about 30 km/h and decelerating or standing still. If the pedestrian warning device according to the invention would be actuated/illuminated at every brake action, it would disturb the traffic by disturbing other vehicle drivers or pedestrians on or at the road, respectively, thereby illuminating the light frame 11 and the lamps 2 and 13 every time the driver presses the brake pedal 5.

The CPU is further so programmed that the pedestrian warning device according to the invention can only be operative when the vehicle is driven forward. This means that the lamp 5 will not be lightened up when the vehicle is reversed. Possibly it may also be inactive when the vehicle has stopped.

It is important that the pedestrian is aware of that the pedestrian warning device according to the invention is installed in the vehicle in question. It is clear that not all vehicles can simultaneously be equipped with such a device. However, this can be achieved by giving the lamps 2, 12 and/or 13 a special appearance or by lightening up the lamp with a specially coloured light. Such a special appearance is the awareness signal apparatus, such as the awareness lamp or lamps 12 and/or the light frame 11 shown in the embodiment of FIG. 2. By a combination of these issues and thereto maybe even provide the brake lamp 2 with a flashing light, the pedestrian will without doubt notice that it concerns a pedestrian warning device according to the invention. The colour of each lamp 2, 12, 13 must be of a kind which can be allowed to be mounted at the front of a vehicle, such as white or yellow or any other permissible colour.

Moreover, the pedestrian warning device according to the invention only provides that the pedestrian becomes aware of that the driver is going to activate the brake system of the vehicle by pressing the brake pedal 5 a considerable amount. It is evident that this does not mean that the driver has detected the pedestrian. However, many accidents occur when the pedestrian believes that the driver has paid notice of him/her. If the pedestrian can be aware of the fact that the driver of an approaching vehicle has paid notice, and decided to stop, e.g. by pressing the brake pedal to obtain a braking effect (or has taken any other measure (e.g. stopped and pulled the hand brake) that will eliminate any risk for hitting a pedestrian), this will obviously reduce the risk of a collision, since the pedestrian may then be ascertained that there is no risk to be hit.

A further possibility, either alone or in combination with that described above, that said certain predetermined condition for activation of the system shall occur, may include using the output from an inertia measurement unit, preferably equipped with MEMS accelerometer and MEMS gyro meter, sensing that the vehicle is not accelerating and also that the vehicle is either standing still or decelerating.

At a further development of the pedestrian warning device according to the invention it can be incorporated in or mounted on both normal headlights 14 of the vehicle. Such a device is shown with broken lines in FIG. 1 and is denoted with the reference number 15. In this way of example, the awareness signal device is a substantially half circular frame 16 mounted at the top of the head lights 14 and the front brake lamp 17 is mounted at the top just underneath said frame 16. This mounting of the pedestrian warning device according to the invention can be advantageous by direct mounting it in vehicles by the manufacturing thereof. A loose lamp of the pedestrian warning device according to the embodiments of the device according to the invention, as is shown both in FIGS. 1 and 2, can also be mounted on used cars without any great effort.

Another favourable result of the provision of the pedestrian warning device according to the invention on a vehicle front portion is that a pedestrian which, e.g., by means of the awareness signal apparatus, is aware of the pedestrian warning device according to the invention at the front of a vehicle observes that the front brake lamps 2, 13 are not lightened up, the pedestrian will hesitate and stop at the side of the road. Thereby, the pedestrian will become aware of that either the brake lamps are defective or that the driver has not observed the pedestrian. If the lamp or lamps of the pedestrian warning device according to the invention is/are defective in some way, the pedestrian will notice that either the brake lamp 2 of the first embodiment is not illuminated and/or the awareness LED-lamps 12 provided on the frame and/or the central brake lamp 13 is/are not illuminated. The pedestrian, which is aware of the pedestrian warning device according to the invention, will hesitate and stop at the road side until the vehicle has virtually stopped.

The pedestrian warning device according to the invention can be modified so that features of the described different embodiments can be combined within the scope of the appended claims.

The invention claimed is:

1. A pedestrian warning device for a vehicle which is configured to be driven on public roads, the pedestrian warning device comprising:
    a programmable unit that is a central processing unit (CPU);
    a brake pedal;
    at least one front brake lamp mounted at a front portion of the vehicle, said front brake lamp to be lighted up by said programmable unit when at least one certain predetermined condition is met; and
    an awareness signal apparatus provided with at least one awareness lamp, the awareness signal apparatus being a light frame which has a circular form and which at least partly surrounds the front brake lamp.

2. The pedestrian warning device according to claim 1, wherein said certain condition includes one or more of the brake pedal having been pressed down a predetermined distance, and having been pressed down by a predetermined pressure and more.

3. The pedestrian warning device according to claim 2, wherein said certain condition includes using an output from an inertia measurement unit, one or more of sensing that the vehicle is not accelerating, sensing that the vehicle is standing still, and sensing that the vehicle is retarding.

4. The pedestrian warning device according to claim 2, wherein the front brake lamp emits a fixed light.

5. The pedestrian warning device according to claim 2, wherein the front brake lamp emits a flashing light.

6. The pedestrian warning device according to claim 1, wherein said certain condition includes using an output from an inertia measurement unit, one or more of sensing that the vehicle is not accelerating, sensing that the vehicle is standing still, and sensing that the vehicle is retarding.

7. The pedestrian warning device according to claim 6, wherein the inertia measurement unit is equipped with a micro electro-mechanical system (MEMS) accelerometer and a MEMS gyro meter.

8. The pedestrian warning device according to claim 1, wherein the front brake lamp emits a fixed light.

9. The pedestrian warning device according to claim 1, wherein the front brake lamp emits a flashing light.

10. The pedestrian warning device according to claim 1, wherein the front brake lamp is combined with an alarm signal, which emits a sound when said front brake lamp is illuminated.

11. The pedestrian warning device according to claim 1, wherein the pedestrian warning device is configured to be actuated when the vehicle is driven below a predetermined speed level.

12. The pedestrian warning device according to claim 11, wherein the predetermined speed level is in a range of 20 to 35 km/h.

13. The pedestrian warning device according to claim 12, wherein the predetermined speed level is about 30 km/h.

14. The pedestrian warning device according to claim 1, wherein the light frame comprises a predetermined number of LED-lamps spread along the circumstance of the light frame.

15. The pedestrian warning device according to claim 14, wherein the predetermined number of LED-lamps are spread mutually equal interspaces along the circumstance of the light frame.

16. The pedestrian warning device according to claim 1, wherein the pedestrian warning device is mounted in or on head lights of the vehicle.

* * * * *